United States Patent
Koncz

(10) Patent No.: US 9,199,715 B2
(45) Date of Patent: Dec. 1, 2015

(54) SELF-ALIGNING FITTING ASSEMBLIES AND SYSTEMS AND METHODS INCLUDING THE SAME

(71) Applicant: The Boeing Company, Seal Beach, CA (US)

(72) Inventor: Tibor A. Koncz, Monroe, WA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 14/261,217

(22) Filed: Apr. 24, 2014

(65) Prior Publication Data
US 2015/0102170 A1 Apr. 16, 2015

Related U.S. Application Data
(60) Provisional application No. 61/889,186, filed on Oct. 10, 2013.

(51) Int. Cl.
| | | |
|---|---|---|
| B64C 1/00 | (2006.01) | |
| B64C 1/06 | (2006.01) | |
| B64C 1/18 | (2006.01) | |
| B64F 5/00 | (2006.01) | |

(52) U.S. Cl.
CPC . *B64C 1/068* (2013.01); *B64C 1/18* (2013.01); *B64F 5/0009* (2013.01)

(58) Field of Classification Search
USPC .................................................. 244/119, 131
See application file for complete search history.

(56) References Cited

U.S. PATENT DOCUMENTS

| | | | |
|---|---|---|---|
| 3,045,834 A | 7/1962 | Seiz | |
| 3,288,192 A | 11/1966 | Bollinger | |
| 5,806,797 A * | 9/1998 | Micale | B23P 21/00 244/120 |
| 7,497,638 B2 * | 3/2009 | Tubbs | B64D 11/003 244/118.1 |
| 7,721,992 B2 * | 5/2010 | Keeler, Jr. | B64C 1/18 244/119 |

(Continued)

FOREIGN PATENT DOCUMENTS

| | | |
|---|---|---|
| BE | 1008803 | 8/1996 |
| EP | 2280865 | 2/2011 |
| GB | 2436971 | 10/2007 |

OTHER PUBLICATIONS

Machine-generated English-language translation of the abstract of BE1008803, European Patent Office, Dec. 5, 2014.

(Continued)

*Primary Examiner* — Christopher P Ellis
(74) *Attorney, Agent, or Firm* — Dascenzo Intellectual Property Law, P.C.

(57) ABSTRACT

Self-aligning fitting assemblies and systems and methods including the same are disclosed herein. The self-aligning fitting assemblies include a barrel-side fitting that includes a plurality of barrel-side attachment holes and a floor-side fitting that includes a plurality of floor-side attachment holes. The self-aligning fitting assemblies also include an alignment pin recess and a fitting alignment recess. The methods include translating a floor grid relative to a fuselage barrel, operatively aligning a plurality of alignment pin recesses with a corresponding plurality of fitting alignment recesses, and locating a plurality of alignment pins within the plurality of alignment pin recesses such that each of the plurality of alignment pins extends through a respective one of the plurality of fitting alignment recesses. The methods also include lowering the floor grid relative to the fuselage barrel and installing a plurality of fasteners.

20 Claims, 4 Drawing Sheets

(56) References Cited

U.S. PATENT DOCUMENTS

| | | | | |
|---|---|---|---|---|
| 7,775,478 B2 * | 8/2010 | Wood | ............ | B64C 1/068 244/119 |
| 7,967,251 B2 * | 6/2011 | Wood | ............ | B64C 1/18 244/118.2 |
| 8,157,210 B2 * | 4/2012 | Huber | ............ | B64C 1/061 244/118.1 |
| 8,403,261 B2 * | 3/2013 | Delahaye | ............ | B64F 5/0009 244/118.5 |
| 8,430,362 B2 * | 4/2013 | Graeber | ............ | B64C 1/066 244/118.5 |
| 8,814,091 B2 * | 8/2014 | Zorzetto | ............ | B64C 1/18 244/119 |
| 2013/0032670 A1 * | 2/2013 | Endres | ............ | B64C 1/068 244/131 |
| 2015/0151829 A1 * | 6/2015 | Hachenberg | ............ | B64C 1/062 244/131 |

OTHER PUBLICATIONS

English translation of the abstract of published application WO2009138593, published Nov. 19, 2009, from which EP2280865 issued, European Patent Office, Dec. 8, 2014.

* cited by examiner

SELF-ALIGNING FITTING ASSEMBLIES AND SYSTEMS AND METHODS INCLUDING THE SAME

RELATED APPLICATION

This application claims priority to U.S. Provisional Patent Application No. 61/889,186, which was filed on Oct. 10, 2013 and is hereby incorporated by reference.

FIELD

The present disclosure is directed generally to self-aligning fitting assemblies and more particularly to self-aligning fitting assemblies that may be utilized to align a floor grid of an airframe with a fuselage barrel of the airframe and/or to systems and methods that utilize self-aligning fitting assemblies.

BACKGROUND

Aircraft often include several different, or discrete, sub-assemblies that are separately manufactured and subsequently combined during assembly of the aircraft. Each of these sub-assemblies may be manufactured at different locations (geographically and/or within a given manufacturing facility) to specified manufacturing tolerances. Often, these sub-assemblies may be quite large, and assembly of the sub-assemblies to construct the aircraft many present unique manufacturing challenges.

As an illustrative, non-exclusive example, a floor grid, or passenger floor grid, of an aircraft may be manufactured separately from a fuselage barrel, or fuselage, of the aircraft. Subsequently, the floor grid may be located within and operatively attached to the fuselage barrel. Both the floor grid and the fuselage barrel are relatively large components, and their assembly may require specialized support and/or transportation structures. In addition, alignment of the floor grid with the fuselage barrel may be a time-consuming and/or expensive process that requires a significant amount of manufacturing resources. Thus, there exists a need for self-aligning fitting assemblies and/or for systems and/or methods including self-aligning fitting assemblies.

SUMMARY

Self-aligning fitting assemblies and systems and methods including the same are disclosed herein. The self-aligning fitting assemblies include a barrel-side fitting that includes a plurality of barrel-side attachment holes and a floor-side fitting that includes a plurality of floor-side attachment holes. The self-aligning fitting assemblies also include an alignment pin recess and a fitting alignment recess. The alignment pin recess is formed within one of the barrel-side fitting and the floor-side fitting, and the fitting alignment recess is formed within the other of the barrel-side fitting and the floor-side fitting. The alignment pin recess is configured to receive an alignment pin that includes an alignment surface. When the alignment pin is received within the alignment pin recess, the alignment surface extends through the fitting alignment recess. The fitting alignment recess is sized to permit translation of the alignment surface therein. Thus, the fitting alignment recess permits translation of the barrel-side fitting and the floor-side fitting relative to one another between a first orientation, in which the plurality of floor-side attachment holes is not aligned with the plurality of barrel-side attachment holes, and a second orientation, in which the plurality of floor-side attachment holes is aligned with the plurality of barrel-side attachment holes.

The methods include translating a floor grid relative to a fuselage barrel to operatively locate the floor grid within the fuselage barrel. The floor-grid is operatively attached to a plurality of floor-side fittings that includes a plurality of floor-side attachment holes. The fuselage barrel is operatively attached to a plurality of barrel-side fittings that includes a plurality of barrel-side attachment holes. The methods further include operatively aligning a plurality of alignment pin recesses with a corresponding plurality of fitting alignment recesses. The plurality of alignment pin recesses is formed within one of the plurality of floor-side fittings and the plurality of barrel-side fittings. The plurality of fitting alignment recesses is formed within the other of the plurality of floor-side fittings and the plurality of barrel-side fittings. The methods also include locating a plurality of alignment pins within the plurality of alignment pin recesses such that each of the plurality of alignment pins extends through a respective one of the plurality of fitting alignment recesses. The methods further include lowering the floor grid relative to the fuselage barrel to translate the plurality of barrel-side fittings and the plurality of floor-side fittings relative to one another from a first orientation, in which the plurality of floor-side attachment holes is not aligned with the plurality of barrel-side attachment holes, to a second orientation, in which the plurality of floor-side attachment holes is aligned with the plurality of barrel-side attachment holes. The plurality of fitting alignment recesses is shaped to direct the plurality of floor-side fittings and the plurality of barrel-side fittings toward the second orientation during the lowering. The methods also include installing a plurality of fasteners by extending each of the plurality of fasteners through a selected one of the plurality of barrel-side attachment holes and also through a corresponding one of the plurality of floor-side attachment holes.

DESCRIPTION

Figure 1:
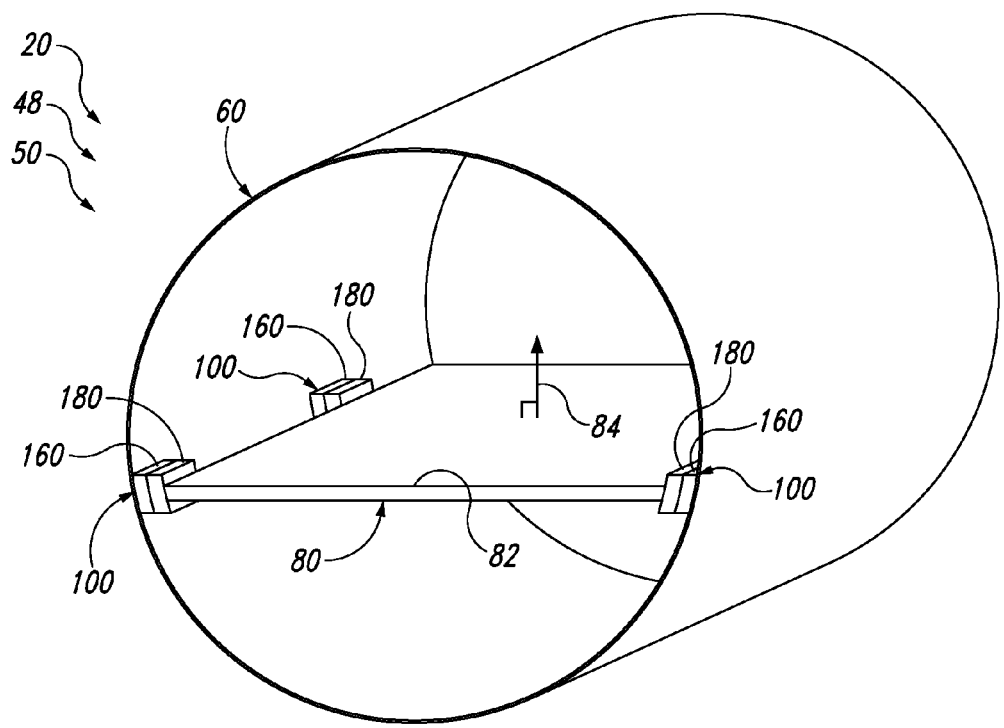
FIG. 1 is a schematic representation of an airframe that may include a fuselage barrel, a floor grid, and self-aligning fitting assemblies according to the present disclosure.

FIGS. 1-7 provide illustrative, non-exclusive examples of self-aligning fitting assemblies 100 according to the present disclosure, of airframes 50 that may include self-aligning fitting assemblies 100, of airframe assembly systems 20 that may include and/or utilize self-aligning fitting assemblies 100, of components thereof, and/or of methods of utilizing the same. Elements that serve a similar, or at least substantially similar, purpose are labeled with like numbers in each of FIGS. 1-7, and these elements may not be discussed in detail herein with reference to each of FIGS. 1-7. Similarly, all elements may not be labeled in each of FIGS. 1-7, but reference numerals associated therewith may be utilized herein for consistency. Elements, components, and/or features that are discussed herein with reference to one or more of FIGS. 1-7 may be included in and/or utilized with any of FIGS. 1-7 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and elements shown in solid lines may be omitted from a particular embodiment without departing from the scope of the present disclosure.

FIG. 1 is a schematic representation of an airframe 50 according to the present disclosure. Airframe 50 may form a portion of, may be utilized with, and/or may be constructed with an airframe assembly system 20 and also may form a portion of an aircraft 48.

Airframe 50 may include a fuselage barrel 60, a floor grid 80, and a plurality of self-aligning fitting assemblies 100 according to the present disclosure. As discussed in more detail herein, self-aligning fitting assemblies 100 may be selected, designed, adapted, configured, sized, and/or constructed to operatively align floor grid 80 and fuselage barrel 60 during assembly of airframe 50. Additionally or alternatively, self-aligning fitting assemblies 100 also may be selected, designed, adapted, configured, sized, and/or constructed to operatively attach floor grid 80 to fuselage barrel 60 during and/or subsequent to assembly of airframe 50.

Self-aligning fitting assemblies 100 may include a barrel-side fitting 160, which may be operatively attached to fuselage barrel 60 prior to floor grid 80 being located within fuselage barrel 60. Self-aligning fitting assemblies 100 also may include a floor-side fitting 180, which may be operatively attached to floor grid 80 prior to floor grid 80 being located within fuselage barrel 60. Subsequent to floor grid 80 being located within fuselage barrel 60, barrel-side fitting 160 may be operatively attached to floor-side fitting 180 to operatively attach floor grid 80 to fuselage barrel 60.

Floor grid 80 may define a surface 82, which also may be referred to herein as a passenger surface 82 and/or as an upper surface 82. Surface 82 may define (or may be referred to herein as) a surface plane 82 and/or a passenger surface plane 82. Surface plane 82 may define a surface normal direction 84.

Figure 2:
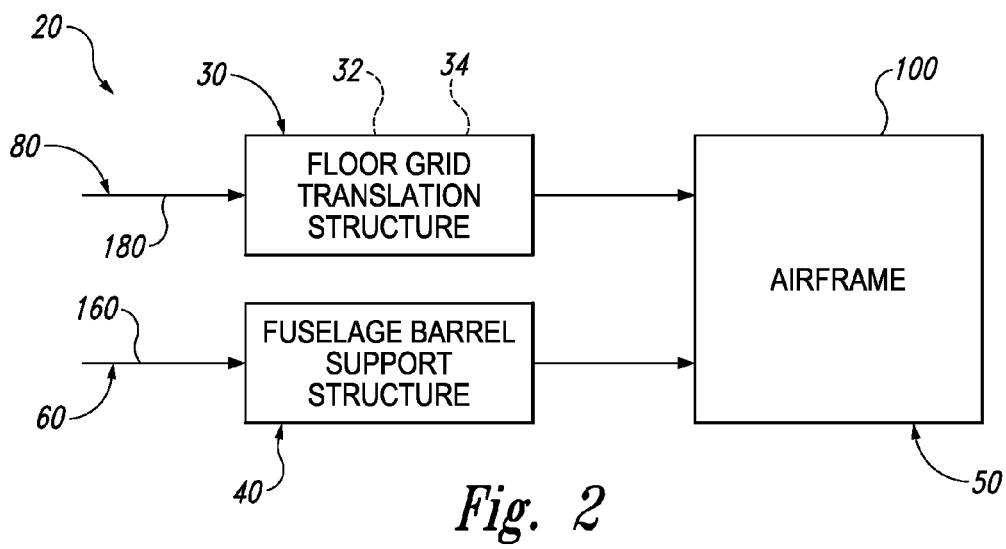
FIG. 2 is a schematic representation of illustrative, non-exclusive examples of an airframe assembly system according to the present disclosure that may be utilized to construct at least a portion of an airframe.

FIG. 2 is a schematic representation of illustrative, non-exclusive examples of an airframe assembly system 20 according to the present disclosure that may be utilized to construct at least a portion of an airframe 50. Airframe assembly system 20 may be configured to operatively attach a floor grid 80 to a fuselage barrel 60 to define airframe 50.

Airframe assembly system 20 may include a floor grid translation structure 30 that may be configured to operatively locate floor grid 80 relative to fuselage barrel 60. Floor grid translation structure 30 may include and/or be a gantry crane 32 that is configured to operatively translate floor grid 80. Floor grid translation structure 30 also may include and/or be a floor grid support jig 34 that is configured to operatively support floor grid 80.

Airframe assembly system 20 also may include a fuselage barrel support structure 40. Fuselage barrel support structure 40 may be configured to operatively support fuselage barrel 60 while floor grid 80 is operatively located with respect thereto.

As discussed in more detail herein, fuselage barrel 60 may include one or more barrel-side fittings 160. In addition, floor grid 80 may include one or more floor-side fittings 180. During assembly of fuselage barrel 60, barrel-side fittings 160 and floor-side fittings 180 may form a self-aligning fitting assembly 100. Self-aligning fitting assembly 100 may be configured to cooperatively align floor grid 80 and fuselage barrel 60 and/or to operatively attach floor grid 80 to fuselage barrel 60 during and/or subsequent to assembly of airframe 50.

Figure 3:
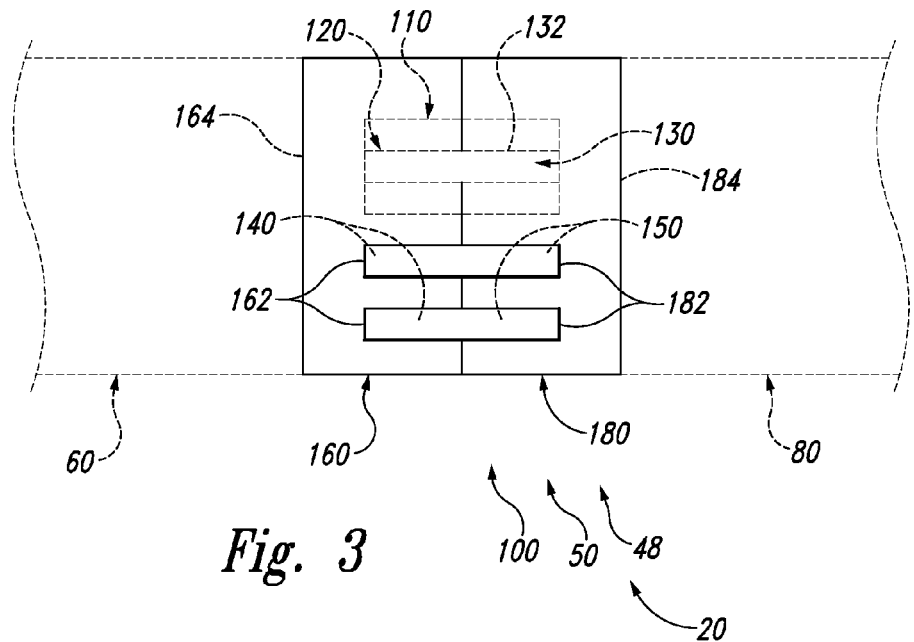
FIG. 3 is a schematic representation of illustrative, non-exclusive examples of a self-aligning fitting assembly according to the present disclosure.

FIG. 3 is a schematic representation of illustrative, non-exclusive examples of a self-aligning fitting assembly 100 according to the present disclosure. Self-aligning fitting assembly 100 also may be referred to herein as a fitting assembly 100 and/or as an assembly 100. Assembly 100 is configured to align and operatively attach a floor grid 80 with a fuselage barrel 60 of an airframe 50 and/or of an aircraft 48.

Self-aligning fitting assembly 100 includes a barrel-side fitting 160 and a floor-side fitting 180. Barrel-side fitting 160 is configured to be operatively attached to fuselage barrel 60, such as via one or more barrel-side retention structures 164. In addition, floor-side fitting 180 is configured to be operatively attached to floor grid 80, such as via one or more floor-side retention structures 184.

Barrel-side fitting 160 includes and/or defines a plurality of barrel-side attachment holes 162, and floor-side fitting 180 includes and/or defines a plurality of floor-side attachment holes 182. Each of the plurality of floor-side attachment holes 182 is designed, adapted, configured, sized, and/or located to be operatively aligned with a respective one of the plurality of barrel-side attachment holes 162, as illustrated in FIG. 3. This operative alignment may permit insertion of an expanding pin 140 and/or a fastener 150 therethrough, as discussed in more detail herein.

Self-aligning fitting assembly 100 also includes and/or defines an alignment pin recess 120. Alignment pin recess 120 is illustrated in dashed lines in FIG. 3 to indicate that alignment pin recess 120 may be defined by and/or formed within barrel-side fitting 160 or by floor-side fitting 180. Alignment pin recess 120 is sized to receive an alignment pin 130, which extends from alignment pin recess 120 to define an alignment surface 132. As illustrated in FIG. 3, an inside dimension of alignment pin recess 120 may be at least substantially similar to an outer dimension of alignment pin 130. As such, alignment pin 130 may be at least substantially immobile relative to alignment pin recess 120 when received therein.

Self-aligning fitting assembly 100 also includes and/or defines a fitting alignment recess 110. Fitting alignment recess 110 is illustrated in dashed lines in FIG. 3 to indicate that fitting alignment recess 110 may be defined by and/or formed within barrel-side fitting 160 or by floor-side fitting 180. Generally, alignment pin recess 120 will be defined by and/or formed within one of barrel-side fitting 160 or floor-side fitting 180, and fitting alignment recess 110 will be defined by and/or formed within the other of barrel-side fitting 160 and floor-side fitting 180.

When alignment pin 130 is received in alignment pin recess 120 and self-aligning fitting assembly 100 is utilized to align and/or operatively attach fuselage barrel 60 to floor grid 80, alignment pin 130 and/or or alignment surface 132 thereof may extend from alignment pin recess 120 and through fitting alignment recess 110.

As illustrated in FIG. 3, fitting alignment recess 110 may be sized to permit translation of alignment surface 132 therein. Thus, fitting alignment recess 110 may permit translation of barrel-side fitting 160 relative to floor-side fitting 180. This translation may include translation among a plurality of relative orientations that include at least a first relative orientation, in which the plurality of floor-side attachment holes 182 is not aligned with the plurality of barrel-side attachment holes 162, and a second relative orientation, in which the plurality of floor-side attachment holes 182 is aligned with the plurality of barrel-side attachment holes 162. This is discussed in more detail herein with reference to FIGS. 5-6.

It is within the scope of the present disclosure that barrel-side fitting 160 may define any suitable number of barrel-side attachment holes 162. Similarly, it is also within the scope of the present disclosure that floor-side fitting 180 may define any suitable number of floor-side attachment holes 182. As illustrative, non-exclusive examples, barrel-side fitting 160 may define at least 2, exactly 2, at least 3, exactly 3, at least 4, or exactly 4 barrel-side attachment holes 162; and floor-side fitting 180 may define a corresponding number of floor-side attachment holes 182.

Alignment pin recess 120 may include any suitable structure that is configured to receive and/or retain alignment pin 130. As illustrative, non-exclusive examples, alignment pin recess 120 may include and/or be a hole, a cylindrical hole, a cylindrical hole that is sized to receive a threaded portion of alignment pin 130, and/or a cylindrical hole with a shallow countersink that is sized to receive both the threaded portion of alignment pin 130 and a portion of alignment surface 132. In addition, alignment pin 130 may include any suitable structure that may be received within alignment pin recess 120 and/or that includes alignment surface 132. As illustrative, non-exclusive examples, alignment pin 130 may include and/or be a pin, a bolt, and/or a shoulder bolt.

Expanding pin 140, when present, may include any suitable structure that may be configured to extend through a selected floor-side attachment hole 182 and also through a corresponding barrel-side attachment hole 162 to operatively align the selected floor-side attachment hole 182 with the corresponding barrel-side attachment hole 162. As an illustrative, non-exclusive example, expanding pin 140 may be configured to transition between a contracted conformation, which includes and/or defines a contracted diameter, and an expanded conformation, which includes and/or defines an expanded diameter, with the expanded diameter being greater than the contracted diameter.

In operation, and as discussed in more detail herein, selected floor-side attachment hole 182 may be partially aligned with corresponding barrel-side attachment hole 162, such as via locating alignment pin 130 within alignment pin recess 120 and also within fitting alignment recess 110. Expanding pin 140 then may be located within both the selected floor-side attachment hole 182 and the corresponding barrel-side attachment hole 162 while expanding pin 140 is in the contracted state. Then, expanding pin 140 may be transitioned to the expanded state. This transition of expanding pin 140 may operatively align the selected floor-side attachment hole 182 with the corresponding barrel-side attachment hole 162. A clamping device then may be utilized to at least temporarily fix barrel-side fitting 160 and floor-side fitting 180 in a desired relative orientation. Expanding pin 140 then may be removed from the selected floor-side attachment hole 182 and also from the corresponding barrel-side attachment hole 162, thereby permitting fastener 150 to be located within the selected floor-side attachment hole 182 and also within the corresponding barrel-side attachment hole 162. Fastener 150 then may be tightened to retain barrel-side fitting 160 and floor-side fitting 180 in the desired relative orientation. Subsequently, the clamping device may be removed.

Figure 4:
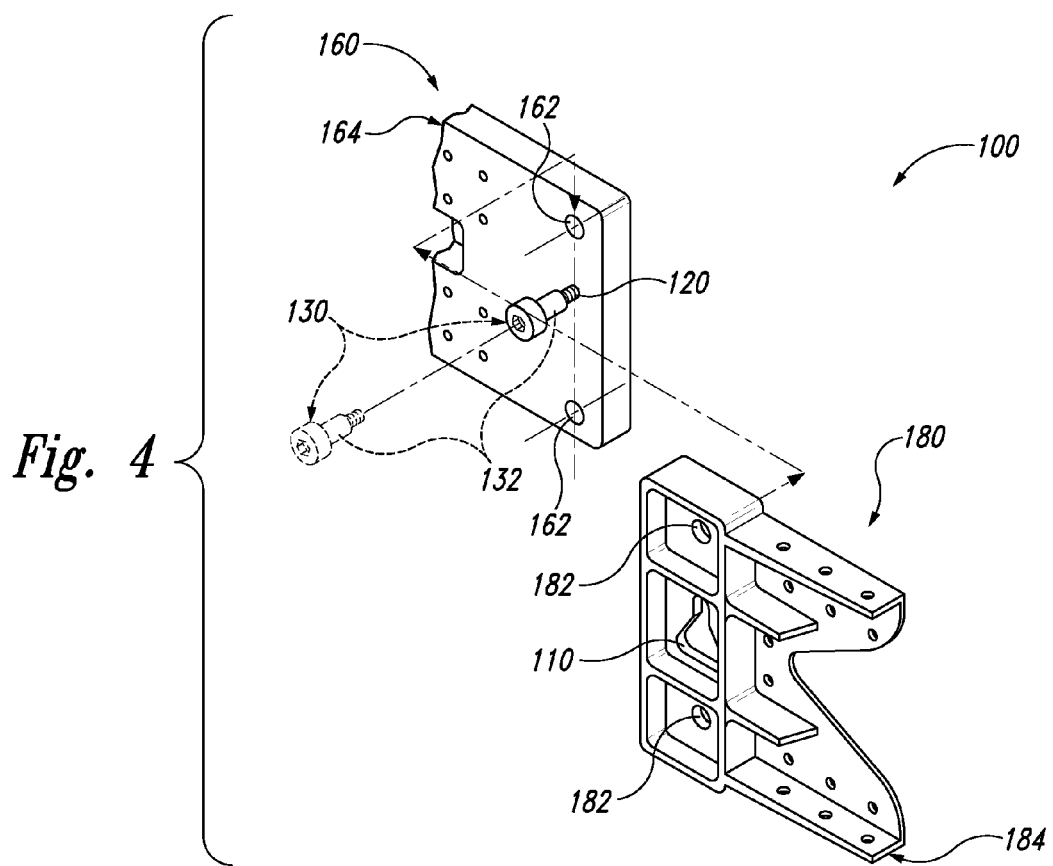
FIG. 4 is an exploded view of an illustrative, non-exclusive example of a self-aligning fitting assembly according to the present disclosure.

FIG. 4 is an exploded view of a more specific but still illustrative, non-exclusive example of a self-aligning fitting assembly 100 according to the present disclosure. Self-aligning fitting assembly 100 of FIG. 4 may include and/or be self-aligning fitting assembly 100 of FIGS. 1-3.

In FIG. 4, self-aligning fitting assembly 100 includes a barrel-side fitting 160 and a floor-side fitting 180. Barrel-side fitting 160 includes and/or defines a plurality of barrel-side attachment holes 162, and floor-side fitting 180 includes and/or defines a plurality of floor-side attachment holes 182. Barrel-side fitting 160 also includes and/or defines a barrel-side retention structure 164 that is configured to operatively attach barrel-side fitting 160 to a fuselage barrel (as illustrated in FIG. 3 at 60). Similarly, floor-side fitting 180 includes and/or defines a floor-side retention structure 184 that is configured to operatively attach floor-side fitting 180 to a floor grid (as illustrated in FIG. 3 at 80).

Barrel-side fitting 160 further includes and/or defines an alignment pin recess 120. Alignment pin recess 120 may be configured to receive an alignment pin 130, such as a shoulder bolt, that includes and/or defines an alignment surface 132. In FIG. 4, alignment pin 130 is illustrated both disassembled from barrel-side fitting 160 (in dashed lines) and assembled with barrel-side fitting 160 (in solid lines).

Floor-side fitting 180 further includes and/or defines a fitting alignment recess 110. As discussed in more detail herein, fitting alignment recess 110 may be sized to receive alignment pin 130 and/or alignment surface 132 thereof. In addition, and as also discussed in more detail herein, fitting alignment recess 110 may permit alignment pin 130 and/or alignment surface 132 thereof to translate therein and may be shaped to preferentially align barrel-side attachment holes 162 of barrel-side fitting 160 with floor-side attachment holes 182 of floor-side fitting 180.

Figure 5:
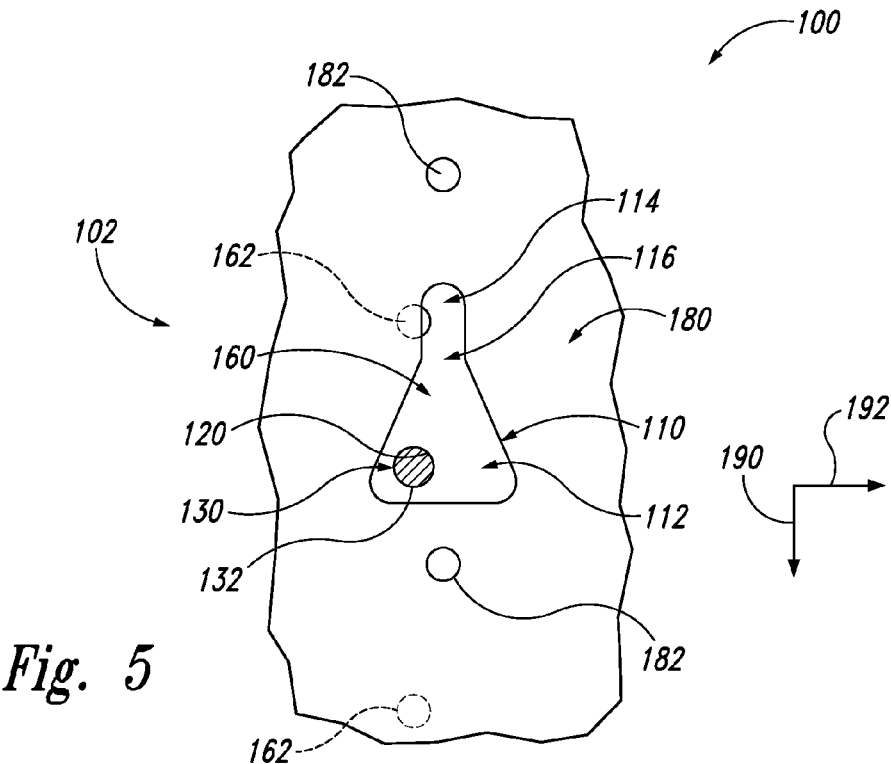
FIG. 5 is a partial view of a self-aligning fitting assembly according to the present disclosure in a first orientation.
Figure 6:
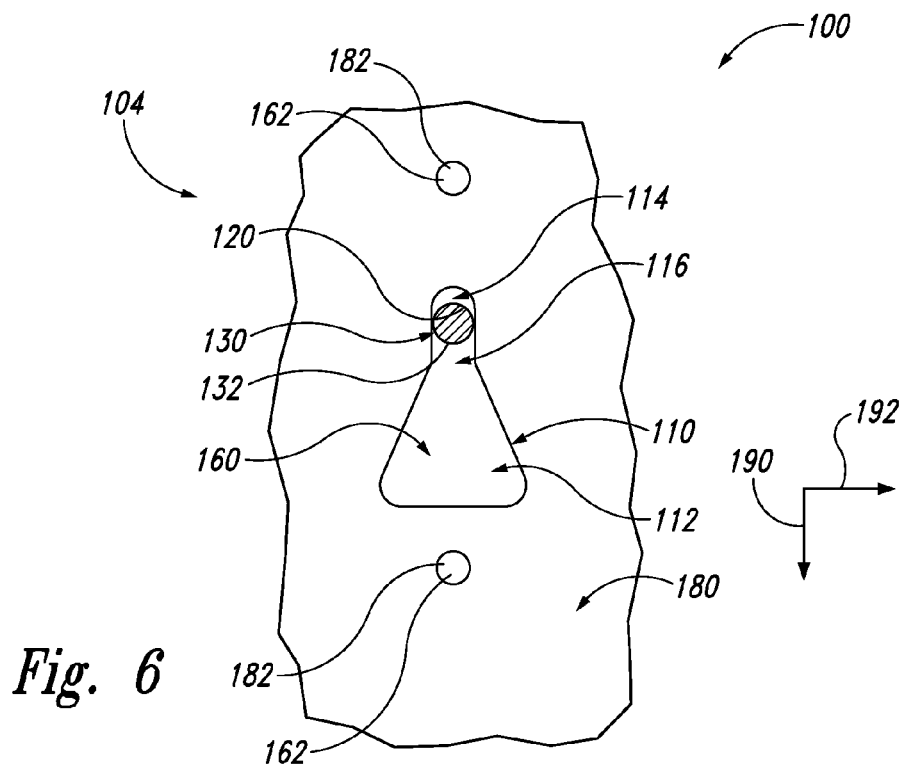
FIG. 6 is a partial view of the self-aligning fitting assembly of FIG. 5 in a second orientation.

FIGS. 5-6 are partial views of a self-aligning fitting assembly 100 according to the present disclosure. The self-aligning fitting assembly of FIGS. 5-6 may be included in and/or may be self-aligning fitting assembly 100 of FIGS. 1-4. Self-aligning fitting assembly 100 includes a floor-side fitting 180 and a barrel-side fitting 160. Barrel-side fitting 160 includes and/or defines an alignment pin recess 120 that has an alignment pin 130 received therein. Alignment pin 130 includes and/or defines an alignment surface 132. Floor-side fitting 180 includes and/or defines a fitting alignment recess 110, and alignment pin 130 extends through fitting alignment recess 110. In FIGS. 5-6, barrel-side fitting 160 is located behind floor-side fitting 180 and is only visible through fitting alignment recess 110.

Fitting alignment recess 110 includes and/or defines a first region 112, a second region 114, and a transition region 116 between first region 112 and second region 114. First region 112 is sized to permit alignment pin 130 and/or alignment surface 132 to translate therein in both directions that are parallel to a first direction 190 and in directions that are parallel to a second direction 192. Second region 114 is sized to permit alignment pin 130 and/or alignment surface 132 to translate therein in directions that are parallel to first direction 190 but to restrict and/or otherwise limit translation of alignment pin 130 and/or alignment surface 132 in directions that are parallel to second direction 192.

In operation, and as illustrated in FIG. 5, barrel-side fitting 160 and floor-side fitting 180 initially may be brought together in a first orientation 102, which also may be referred to herein as a first relative orientation 102. In first orientation 102, alignment pin 130 and/or alignment surface 132 thereof may be located within first region 112 of fitting alignment recess 110. In addition, barrel-side attachment holes 162 of barrel-side fitting 160 may not be aligned with floor-side attachment holes 182 of floor-side fitting 180.

Subsequently, and as illustrated in FIG. 6, barrel-side fitting 160 and floor-side fitting 180 may be translated relative to one another to a second orientation 104, which also may be referred to herein as a second relative orientation 104. In second orientation 104, alignment pin 130 and/or alignment surface 132 thereof may be located within second region 114 of fitting alignment recess 110. In addition, barrel-side attachment holes 162 of barrel-side fitting 160 may be aligned with, at least partially aligned with, and/or substantially aligned with floor-side attachment holes 182 of floor-side fitting 180.

As illustrated in FIGS. 5-6, transition region 116 may be shaped to preferentially direct alignment pin 130 and/or alignment surface 132 thereof from first region 112 to second region 114. As an illustrative, non-exclusive example, and subsequent to self-aligning fitting assembly 100 being placed in first orientation 102 (as illustrated in FIG. 5), a force may be applied to floor-side fitting 180 (and/or to a floor grid 80 that may be attached thereto) to urge alignment pin 130 from first region 112 toward and/or into second region 114 (as illustrated in FIG. 6). In FIGS. 5-6, this may include directing the force in first direction 190.

As also illustrated in FIGS. 5-6, transitioning from first orientation 102 to second orientation 104 may include translating barrel-side fitting 160 and floor-side fitting 180 relative to one another both in directions that are parallel to first direction 190 and in directions that are parallel to second direction 192. As discussed in more detail herein, it is within the scope of the present disclosure that a floor grid 80 that may be operatively attached to floor-side fitting 180 may be at least substantially rigid in directions that are parallel to second direction 192 but may be relatively more flexible in directions that are parallel to first direction 190. As such, translation of barrel-side fitting 160 and floor-side fitting 180 relative to one another in directions that are parallel to first direction 190 may include deformation of the floor grid 80 in directions that are parallel to first direction 190.

It is also within the scope of the present disclosure that a fuselage barrel 60 that may be operatively attached to barrel-side fitting 160 may be at least substantially rigid in directions that are parallel to first direction 190 but may be relatively more flexible in directions that are parallel to second direction 192. As such, translation of barrel-side fitting 160 and floor-side fitting 180 relative to one another in directions that are parallel to second direction 192 may include deformation of the fuselage barrel 60 in directions that are parallel to second direction 192.

Fitting alignment recess 110 and/or first region 112, second region 114, and/or transition region 116 thereof may define any suitable shape. As illustrative, non-exclusive examples, first region 112 may define a (substantially) trapezoidal shape, a (substantially) isosceles trapezoidal shape, and/or a trapezoidal shape that includes and/or defines two (substantially) rounded corners. As another illustrative, non-exclusive example, second region 114 may define a slot that extends from first region 112. As yet another illustrative, non-exclusive example, transition region 116 may provide a (substantially) smooth, gradual, and/or sloped transition from first region 112 to second region 114.

As illustrated in FIGS. 5-6, alignment pin 130 and/or alignment surface 132 thereof may define a circular, or at least substantially circular, cross-sectional shape. When alignment pin 130 has the circular cross-sectional shape and second region 114 is the slot, a width of the slot may be greater than a diameter of alignment pin 130. The width of the slot also may be within a threshold fraction of the diameter of alignment pin 130. Illustrative, non-exclusive examples of the threshold fraction include threshold fractions of less than 1%, less than 2%, less than 3%, less than 4%, less than 5%, less than 6%, less than 7%, less than 8%, less than 9%, or less than 10% of the diameter of alignment pin 130.

Figure 7:
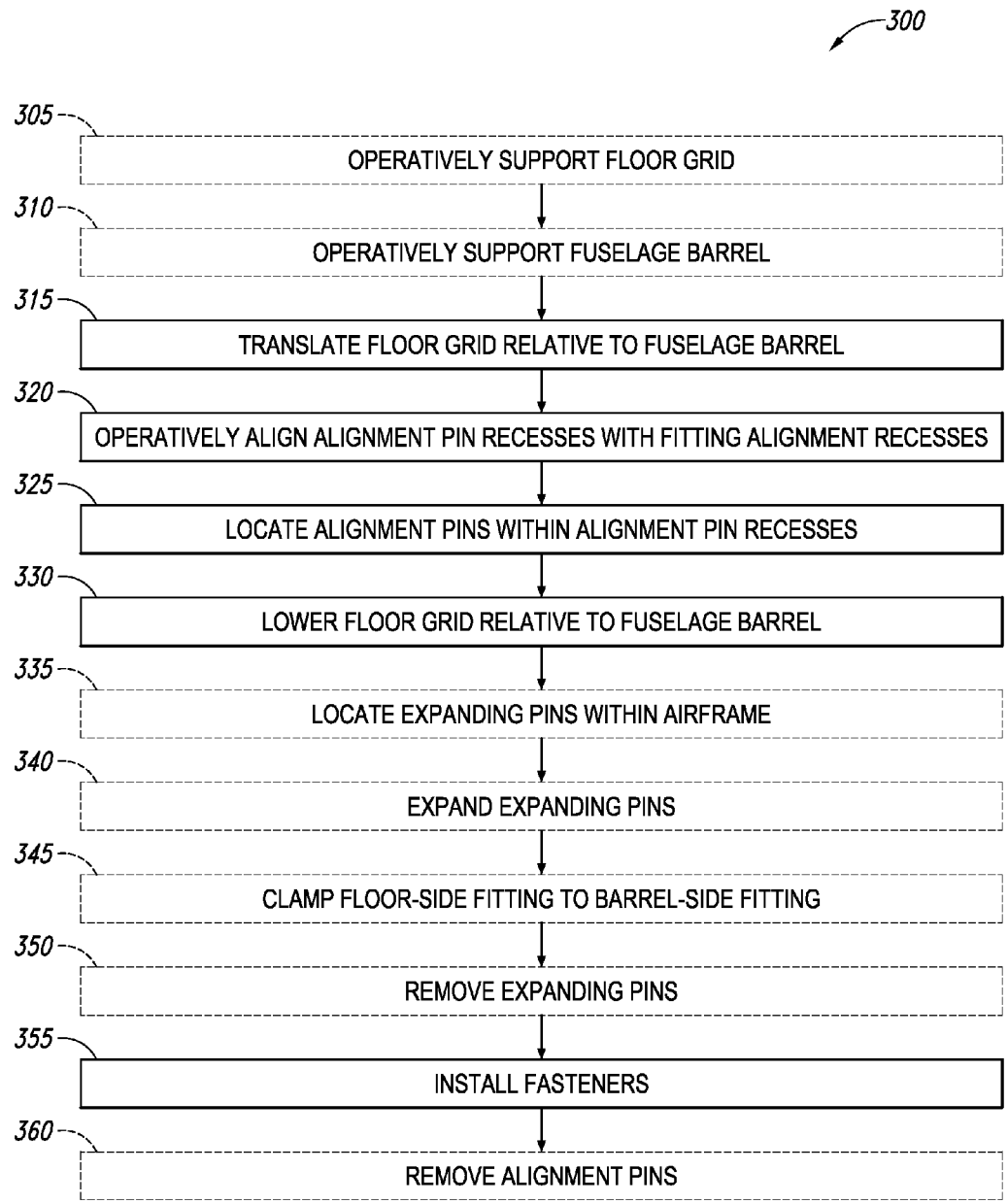
FIG. 7 is a flowchart depicting methods according to the present disclosure of assembling an airframe.

FIG. 7 is a flowchart depicting methods 300 according to the present disclosure of assembling an airframe. In FIG. 7, some steps are illustrated in dashed boxes indicating that such steps may be optional or may correspond to an optional version of methods 300 according to the present disclosure. That said, not all methods 300 according to the present disclosure are required to include the steps illustrated in solid boxes. The methods and steps illustrated in FIG. 7 are not limiting and other methods and steps are within the scope of the present disclosure, including methods having greater than or fewer than the number of steps illustrated, as understood from the discussions herein.

Methods 300 may include operatively supporting a floor grid at 305 and/or operatively supporting a fuselage barrel at 310. Methods 300 include translating the floor grid relative to the fuselage barrel at 315, operatively aligning a plurality of alignment pin recesses with a plurality of fitting alignment recesses at 320, locating a plurality of alignment pins within the plurality of alignment pin recesses at 325, and lowering the floor grid relative to the fuselage barrel at 330. Methods 300 further may include locating a plurality of expanding pins within the airframe at 335, expanding the plurality of expanding pins at 340, clamping a plurality of floor-side fittings to a corresponding plurality of barrel-side fittings at 345, and/or removing the plurality of expanding pins from the airframe at 350. Methods 300 further include installing a plurality of fasteners within the airframe at 355 and also may include removing the plurality of alignment pins at 360.

Operatively supporting the floor grid at 305 may include operatively supporting the floor grid with a floor grid translation structure, such as floor grid translation structure 30 of FIG. 2. Additionally or alternatively, the operatively supporting at 305 also may include operatively supporting the floor grid with a floor grid support jig, such as floor grid support jig 34 of FIG. 2. Operatively supporting the fuselage barrel at 310 may include operatively supporting the fuselage barrel with a fuselage barrel support structure, such as fuselage barrel support structure 40 of FIG. 2.

Translating the floor grid relative to the fuselage barrel at 315 may include translating to operatively locate the floor grid within the fuselage barrel. The floor grid may be operatively attached to the plurality of floor-side fittings and the fuselage barrel may be operatively attached to the plurality of barrel-side fittings. The plurality of floor-side fittings may define a plurality of floor-side attachment holes and the plurality of barrel-side fittings may define a plurality of barrel-side attachment holes. Each of the plurality of floor-side fittings together with a corresponding barrel-side fitting of the plurality of barrel-side fittings may form a self-aligning fitting assembly, such as self-aligning fitting assembly 100 of FIGS. 1-6.

Operatively aligning the plurality of alignment pin recesses with the plurality of fitting alignment recesses at 320 may include operatively aligning to permit the locating at 325. The plurality of alignment pin recesses may be defined by and/or formed within one of the plurality of floor-side fittings and the plurality of barrel-side fittings. The plurality of fitting alignment recesses may be defined by and/or formed within the other of the plurality of floor-side fittings and the plurality of barrel-side fittings. It is within the scope of the present disclosure that the operatively aligning at 320 may include lowering the floor grid within the fuselage barrel to operatively align each of the plurality of alignment pin recesses with a corresponding one of the plurality of fitting alignment recesses.

The floor grid may define a passenger surface that has a surface normal direction, and the operatively aligning at 320 may include deforming the floor grid in a direction that is (at least substantially) parallel to the surface normal direction. The operatively aligning at 320 also may include deforming the fuselage barrel in a direction that is (at least substantially) perpendicular to the surface normal direction. The deforming the floor grid may be performed (at least substantially) concurrently with the deforming the fuselage barrel.

Locating the plurality of alignment pins within the plurality of alignment pin recesses at 325 may include locating the plurality of alignment pins in any suitable manner. As an illustrative, non-exclusive example, the locating at 325 may include bolting and/or threading the plurality of alignment pins into the plurality of alignment pin recesses. As another illustrative, non-exclusive example, the locating at 325 also may include placing, inserting, and/or pressing the plurality of alignment pins into the plurality of alignment pin recesses.

The plurality of alignment pins may define a plurality of respective alignment surfaces, and the locating at 325 also may include extending the plurality of alignment pins (and/or the plurality of alignment surfaces thereof) through respective fitting alignment recesses. Thus, and subsequent to the locating at 325, each of the plurality of alignment pins may extend within a respective alignment pin recess and through a corresponding fitting alignment recess.

Lowering the floor grid relative to the fuselage barrel at 330 may include lowering the floor grid to translate the plurality of barrel-side fittings and the plurality of floor-side fittings relative to one another. This may include translating from a first orientation, in which the plurality of floor-side attachment holes is not aligned with the plurality of barrel-side attachment holes, to a second orientation, in which each of the plurality of floor-side attachment holes is at least partially aligned with a corresponding barrel-side attachment hole of the plurality of barrel-side attachment holes. As discussed in more detail herein, the fitting alignment recess may be shaped to direct, or preferentially direct, the plurality of floor-side fittings and the plurality of barrel-side fittings toward the second orientation during the lowering at 330.

Locating the plurality of expanding pins within the airframe at 335 may be performed subsequent to the lowering at 330 and/or prior to the installing at 355. The locating at 335 may include locating the plurality of expanding pins in any suitable manner. As an illustrative, non-exclusive example, the locating at 335 may include extending each of the plurality of expanding pins through a selected floor-side attachment hole of the plurality of floor-side attachment holes and also through a corresponding barrel-side attachment hole of the plurality of barrel-side attachment holes.

Expanding the plurality of expanding pins at 340 may include expanding subsequent to the locating at 335. As discussed in more detail herein, and prior to the expanding at 340, each of the floor-side attachment holes and the corresponding barrel-side attachment hole may be partially, but not completely aligned. This partial alignment may be sufficient to permit the locating at 335 but insufficient to permit the installing at 355. With this in mind, the expanding at 340 may include expanding the plurality of expanding pins, such as by increasing an outer diameter thereof, to align each of the plurality of floor-side attachment holes with the corresponding barrel-side attachment hole, such as to permit the installing at 355.

Clamping the plurality of floor-side fittings to the corresponding plurality of barrel-side fittings at 345 may include clamping to (at least substantially) restrict relative motion between the plurality of floor-side fittings and the plurality of barrel-side fittings. Additionally or alternatively, the clamping at 345 may include clamping to retain alignment of each of the plurality of floor-side attachment holes with the corresponding barrel side attachment hole.

Removing the plurality of expanding pins from the airframe at 350 may include removing the plurality of expanding pins to permit the installing at 355. This may include removing each of the plurality of expanding pins from the selected floor-side attachment hole and also from the corresponding barrel-side attachment hole. The removing at 350 may be subsequent to the clamping at 345. Thus, the removing at 350 may include removing the plurality of expanding pins while retaining the alignment between each of the plurality of floor-side attachment holes and the corresponding barrel-side attachment hole via the clamping at 345.

Installing the plurality of fasteners within the airframe at 355 may include extending each of the plurality of fasteners through a selected one of the plurality of floor-side attachment holes and also through a corresponding one of the plurality of barrel-side attachment holes. The installing at 355 also may include tightening the plurality of fasteners. When methods 300 include the clamping at 345, methods 300 further may include unclamping the plurality of floor-side fittings from the corresponding plurality of barrel-side fittings subsequent to the installing at 355. When methods 300 include the removing at 350, the installing at 355 may be subsequent to the removing at 350.

Removing the plurality of alignment pins at 360 may include removing the plurality of alignment pins in any suitable manner. As an illustrative, non-exclusive example, the removing at 360 may include removing the plurality of alignment pins from the plurality of alignment pin recesses. As another illustrative, non-exclusive example, the removing at 360 also may include removing the plurality of alignment pins from the airframe.

Illustrative, non-exclusive examples of inventive subject matter according to the present disclosure are described in the following enumerated paragraphs:

A1. A self-aligning fitting assembly configured to align and operatively attach a floor grid and a fuselage barrel of an aircraft, the assembly comprising:

a barrel-side fitting that is configured to be operatively attached to the fuselage barrel, wherein the barrel-side fitting includes a plurality of barrel-side attachment holes;

a floor-side fitting that is configured to be operatively attached to the floor grid and to the barrel-side fitting, wherein the floor-side fitting includes a plurality of floor-side attachment holes, and further wherein each of the plurality of floor-side attachment holes is configured to be operatively aligned with a respective one of the plurality of barrel-side attachment holes;

an alignment pin recess; and a fitting alignment recess;

wherein:

(i) the alignment pin recess is formed within one of the barrel-side fitting and the floor-side fitting and is configured to receive an alignment pin that includes an alignment surface;

(ii) the fitting alignment recess is formed within the other of the barrel-side fitting and the floor-side fitting;

(iii) the alignment surface extends through the fitting alignment recess when the alignment pin is received by the alignment pin recess; and (iv) the fitting alignment recess is sized to permit translation of the alignment surface therein, thereby permitting translation of the barrel-side fitting and the floor-side fitting relative to one another in a plurality of relative orientations between a first orientation, in which the plurality of floor-side attachment holes is not aligned with the plurality of barrel-side attachment holes, and a second orientation, in which the plurality of floor-side attachment holes is aligned with the plurality of barrel-side attachment holes.

A2. The assembly of paragraph A1, wherein the fitting alignment recess includes:

(i) a first region that is sized to permit the alignment surface to translate therein in directions that are parallel to a first direction and in directions that are parallel to a second direction that is perpendicular to the first direction; and (ii) a second region that is sized to permit the alignment surface to translate therein in directions that are parallel to the first direction but to restrict translation of the alignment surface in directions that are parallel to the second direction.

A3. The assembly of paragraph A2, wherein the fitting alignment recess further includes a transition region between the first region and the second region.

A4. The assembly of paragraph A3, wherein the transition region is shaped to preferentially direct the alignment surface from the first region to the second region.

A5. The assembly of any of paragraphs A2-A4, wherein the first orientation corresponds to the alignment surface being located within the first region.

A6. The assembly of any of paragraphs A2-A5, wherein the second orientation corresponds to the alignment surface being located within the second region.

A7. The assembly of any of paragraphs A2-A6, wherein the first region includes a trapezoidal, and optionally an isosceles trapezoidal, shape.

A8. The assembly of paragraph A7, wherein the trapezoidal shape includes two rounded corners.

A9. The assembly of any of paragraphs A2-A8, wherein the second region includes a slot that extends from the first region.

A10. The assembly of paragraph A9, wherein the alignment surface includes a circular cross-sectional shape that includes a diameter, wherein a width of the slot is greater than the diameter of the alignment surface and within a threshold fraction of the diameter of the alignment surface.

A11. The assembly of paragraph A10, wherein the threshold fraction is less than 1%, less than 2%, less than 3%, less than 4%, less than 5%, less than 6%, less than 7%, less than 8%, less than 9%, or less than 10% of the diameter of the alignment surface.

A12. The assembly of any of paragraphs A1-A11, wherein the alignment pin recess is formed within the barrel-side fitting, and further wherein the fitting alignment recess is formed within the floor-side fitting.

A13. The assembly of any of paragraphs A1-A12, wherein the plurality of barrel-side attachment holes includes at least two, and optionally exactly two, barrel-side attachment holes.

A14. The assembly of any of paragraphs A1-A13, wherein the plurality of floor-side attachment holes includes at least two, and optionally exactly two, floor-side attachment holes.

A15. The assembly of any of paragraphs A1-A14, wherein the barrel-side fitting includes a barrel-side retention structure that is configured to operatively attach the barrel-side fitting to the fuselage barrel.

A16. The assembly of any of paragraphs A1-A15, wherein the floor-side fitting includes a floor-side retention structure that is configured to operatively attach the floor-side fitting to the floor grid.

A17. The assembly of any of paragraphs A1-A16, wherein the alignment pin recess includes a hole, optionally a cylindrical hole, optionally a cylindrical hole that is sized to receive a threaded portion of the alignment pin, and further optionally a cylindrical hole with a shallow countersink that is sized to receive both the threaded portion of the alignment pin and a portion of the alignment surface.

A18. The assembly of any of paragraphs A1-A17, wherein the assembly includes the alignment pin, and further wherein the alignment pin is received within the alignment pin recess.

A19. The assembly of paragraph A18, wherein the alignment pin extends through the fitting alignment recess.

A20. The assembly of any of paragraphs A18-A19, wherein the barrel-side fitting and the floor-side fitting are in the first orientation.

A21. The assembly of any of paragraphs A18-A20, wherein the barrel-side fitting and the floor-side fitting are in the second orientation.

A22. The assembly of any of paragraphs A18-A21, wherein the alignment pin includes, and optionally is, a shoulder bolt.

A23. The assembly of any of paragraphs A1-A22, wherein the assembly includes an expanding pin that is configured to operatively align a selected floor-side attachment hole of the plurality of floor-side attachment holes with a corresponding barrel-side attachment hole of the plurality of barrel-side attachment holes.

A24. The assembly of paragraph A23, wherein the expanding pin is configured to transition between a contracted conformation, which has a contracted diameter, and an expanded conformation, which has an expanded diameter, to operatively align the selected floor-side attachment hole with the corresponding barrel-side attachment hole, wherein the contracted diameter is less than the expanded diameter.

A25. The assembly of any of paragraphs A1-A24, wherein the assembly further includes a plurality of fasteners, wherein each of the plurality of fasteners extends through a selected floor-side attachment hole of the plurality of floor-side attachment holes and also through a corresponding barrel-side attachment hole of the plurality of barrel-side attachment holes to operatively attach the barrel-side fitting to the floor-side fitting.

B1. An airframe, comprising:
a fuselage barrel;
a floor grid; and
a self-aligning fitting assembly that operatively attaches the fuselage barrel to the floor grid.

B2. The airframe of paragraph B1, wherein the self-aligning fitting assembly includes the self-aligning fitting assembly of any of paragraphs A1-A25.

B3. The airframe of paragraph B2, wherein the barrel-side fitting is operatively attached, and optionally directly attached, to the fuselage barrel.

B4. The airframe of any of paragraphs B2-B3, wherein the floor-side fitting is operatively attached, and optionally directly attached, to the floor grid.

B5. An aircraft, comprising:
the airframe of any of paragraphs B1-B4.

C1. An airframe assembly system that is configured to align and operatively attach a floor grid to a fuselage barrel, the system comprising:

a floor grid translation structure that is configured to support the floor grid and to operatively locate the floor grid relative to the fuselage barrel;

a fuselage barrel support structure that is configured to operatively support the fuselage barrel; and the airframe of any of paragraphs B1-B4.

C2. The system of paragraph C1, wherein the floor grid translation structure includes a gantry crane that is configured to operatively translate the floor grid to operatively locate the floor grid relative to the fuselage barrel.

C3. The system of any of paragraphs C1-C2, wherein the floor grid translation structure includes a floor grid support jig that is configured to support the floor grid.

D1. A method of assembling an airframe, the method comprising:

translating a floor grid relative to a fuselage barrel to operatively locate the floor grid within the fuselage barrel, wherein the floor grid is operatively attached to a plurality of floor-side fittings that includes a plurality of floor-side attachment holes, and further wherein the fuselage barrel is operatively attached to a plurality of barrel-side fittings that includes a plurality of barrel-side attachment holes;

operatively aligning a plurality of alignment pin recesses with a corresponding plurality of fitting alignment recesses, wherein the plurality of alignment pin recesses is formed within one of the plurality of floor-side fittings and the plurality of barrel-side fittings, and further wherein the plurality of fitting alignment recesses is formed within the other of the plurality of floor-side fittings and the plurality of barrel-side fittings;

locating a plurality of alignment pins within the plurality of alignment pin recesses, wherein the plurality of alignment pins includes a plurality of alignment surfaces, and further wherein the locating includes extending the plurality of alignment surfaces through respective fitting alignment recesses of the plurality of fitting alignment recesses;

lowering the floor grid relative to the fuselage barrel to translate the plurality of barrel-side fittings and the plurality of floor-side fittings relative to one another from a first orientation, in which the plurality of floor-side attachment holes is not aligned with the plurality of barrel-side attachment holes, to a second orientation, in which each of the plurality of floor-side attachment holes is at least partially aligned with a corresponding barrel-side attachment hole of the plurality of barrel-side attachment holes, wherein the plurality of fitting alignment recesses is shaped to direct the plurality of floor-side fittings and the plurality of barrel-side fittings toward the second orientation during the lowering; and installing a plurality of fasteners within the airframe by extending each of the plurality of fasteners through a selected one of the plurality of barrel-side attachment holes and also through a corresponding one of the plurality of floor-side attachment holes.

D2. The method of paragraph D1, wherein the operatively aligning includes lowering the floor grid within the fuselage barrel to operatively align the plurality of alignment pin recesses with the corresponding plurality of fitting alignment recesses.

D3. The method of any of paragraphs D1-D2, wherein, prior to the translating, the method further includes operatively supporting the floor grid with a floor grid translation structure.

D4. The method of any of paragraphs D1-D3, wherein, prior to the translating, the method further includes operatively supporting the fuselage barrel with a fuselage barrel support structure.

D5. The method of any of paragraphs D1-D4, wherein, subsequent to the installing, the method further includes removing the plurality of alignment pins from the plurality of alignment pin recesses.

D6. The method of any of paragraphs D1-D5, wherein the airframe includes the airframe of any of paragraphs B1-B4.

D7. The method of any of paragraphs D1-D6, wherein the method further includes performing the method using the system of any of paragraphs C1-C3.

D8. The method of any of paragraphs D1-D7, wherein, subsequent to the lowering the floor grid relative to the fuselage barrel and prior to the installing, the method further includes locating a plurality of expanding pins within the airframe, wherein each of the plurality of expanding pins extends through a selected floor-side attachment hole and also through a corresponding barrel-side attachment hole.

D9. The method of paragraph D8, wherein the method further includes expanding the plurality of expanding pins to align each of the plurality of floor-side attachment holes with the corresponding barrel-side attachment hole.

D10. The method of any of paragraphs D8-D9, wherein the method further includes clamping each of the plurality of floor-side fittings to a corresponding barrel-side fitting to restrict relative motion therebetween.

D11. The method of paragraph D10, wherein, subsequent to the clamping, the method further includes removing each of the plurality of expanding pins from the selected floor-side attachment hole and from the corresponding barrel-side attachment hole.

D12. The method of paragraph D11, wherein the installing is performed subsequent to the removing.

D13. The method of any of paragraphs D1-D12, wherein the floor grid includes a passenger surface that has a passenger surface plane that has a surface normal direction, and further wherein the operatively aligning includes deforming the floor grid in a direction that is parallel to the surface normal direction and concurrently deforming the fuselage barrel in a direction that is perpendicular to the surface normal direction.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A self-aligning fitting assembly configured to align and operatively attach a floor grid and a fuselage barrel of an aircraft, the assembly comprising:
   a barrel-side fitting that is configured to be operatively attached to the fuselage barrel, wherein the barrel-side fitting includes a plurality of barrel-side attachment holes;
   a floor-side fitting that is configured to be operatively attached to the floor grid and to the barrel-side fitting, wherein the floor-side fitting includes a plurality of floor-side attachment holes, and further wherein each of the plurality of floor-side attachment holes is configured to be operatively aligned with a respective one of the plurality of barrel-side attachment holes;
   an alignment pin recess;
   a fitting alignment recess; and
   an alignment pin that includes an alignment surface;
   wherein:
   (i) the alignment pin recess is formed within one of the barrel-side fitting and the floor-side fitting and is configured to receive the alignment pin;
   (ii) the fitting alignment recess is formed within the other of the barrel-side fitting and the floor-side fitting;
   (iii) the alignment pin is received within the alignment pin recess and the alignment surface extends through the fitting alignment recess; and
   (iv) the fitting alignment recess is sized to permit translation of the alignment surface therein, thereby permitting translation of the barrel-side fitting and the floor-side fitting relative to one another in a plurality of relative orientations between a first orientation, in which the plurality of floor-side attachment holes is not aligned with the plurality of barrel-side attachment holes, and a second orientation, in which the plurality of floor-side attachment holes is aligned with the plurality of barrel-side attachment holes.

2. The assembly of claim 1, wherein the fitting alignment recess includes:
   (i) a first region that is sized to permit the alignment surface to translate therein in directions that are parallel to a first direction and in directions that are parallel to a second direction that is perpendicular to the first direction; and
   (ii) a second region that is sized to permit the alignment surface to translate therein in directions that are parallel to the first direction but to restrict translation of the alignment surface in directions that are parallel to the second direction.

3. The assembly of claim 2, wherein the fitting alignment recess further includes a transition region between the first region and the second region, wherein the transition region is shaped to preferentially direct the alignment surface from the first region to the second region.

4. The assembly of claim 2, wherein the first orientation corresponds to the alignment surface being located within the first region, and further wherein the second orientation corresponds to the alignment surface being located within the second region.

5. The assembly of claim 2, wherein the first region includes a trapezoidal shape.

6. The assembly of claim 2, wherein the second region includes a slot that extends from the first region.

7. The assembly of claim 1, wherein the barrel-side fitting includes a barrel-side retention structure that is configured to operatively attach the barrel-side fitting to the fuselage barrel, and further wherein the floor-side fitting includes a floor-side retention structure that is configured to operatively attach the floor-side fitting to the floor grid.

8. The assembly of claim 1, wherein the alignment pin is a shoulder bolt.

9. The assembly of claim 1, wherein the assembly includes an expanding pin that is configured to operatively align a selected floor-side attachment hole of the plurality of floor-side attachment holes with a corresponding barrel-side attachment hole of the plurality of barrel-side attachment holes, and further wherein the expanding pin is configured to transition between a contracted conformation, which has a contracted diameter, and an expanded conformation, which has an expanded diameter, to operatively align the selected floor-side attachment hole with the corresponding barrel-side attachment hole, wherein the contracted diameter is less than the expanded diameter.

10. The assembly of claim 1, wherein the assembly further includes a plurality of fasteners, wherein each of the plurality of fasteners extends through a selected floor-side attachment hole of the plurality of floor-side attachment holes and also through a corresponding barrel-side attachment hole of the plurality of barrel-side attachment holes to operatively attach the barrel-side fitting to the floor-side fitting.

11. An airframe, comprising:
   the self-aligning fitting assembly of claim 1;
   the fuselage barrel; and
   the floor grid.

12. The airframe of claim 11, wherein the barrel-side fitting is operatively attached to the fuselage barrel, and further wherein the floor-side fitting is operatively attached to the floor grid.

13. An airframe assembly system that is configured to align and operatively attach a floor grid to a fuselage barrel, the system comprising:
   a floor grid translation structure that is configured to support the floor grid and to operatively locate the floor grid relative to the fuselage barrel;
   a fuselage barrel support structure that is configured to operatively support the fuselage barrel; and
   the airframe of claim 11.

14. A method of assembling an airframe, the method comprising:
   translating a floor grid relative to a fuselage barrel to operatively locate the floor grid within the fuselage barrel, wherein the floor grid is operatively attached to a plurality of floor-side fittings that includes a plurality of floor-side attachment holes, and further wherein the fuselage barrel is operatively attached to a plurality of barrel-side fittings that includes a plurality of barrel-side attachment holes;
   operatively aligning a plurality of alignment pin recesses with a corresponding plurality of fitting alignment recesses, wherein the plurality of alignment pin recesses is formed within one of the plurality of floor-side fittings and the plurality of barrel-side fittings, and further wherein the plurality of fitting alignment recesses is formed within the other of the plurality of floor-side fittings and the plurality of barrel-side fittings;

locating a plurality of alignment pins within the plurality of alignment pin recesses, wherein the plurality of alignment pins includes a plurality of alignment surfaces, and further wherein the locating includes extending the plurality of alignment surfaces through respective fitting alignment recesses of the plurality of fitting alignment recesses;

lowering the floor grid relative to the fuselage barrel to translate the plurality of barrel-side fittings and the plurality of floor-side fittings relative to one another from a first orientation, in which the plurality of floor-side attachment holes is not aligned with the plurality of barrel-side attachment holes, to a second orientation, in which each of the plurality of floor-side attachment holes is at least partially aligned with a corresponding barrel-side attachment hole of the plurality of barrel-side attachment holes, wherein the plurality of fitting alignment recesses is shaped to direct the plurality of floor-side fittings and the plurality of barrel-side fittings toward the second orientation during the lowering; and installing a plurality of fasteners within the airframe by extending each of the plurality of fasteners through a selected one of the plurality of barrel-side attachment holes and also through a corresponding one of the plurality of floor-side attachment holes.

15. The method of claim 14, wherein, subsequent to the installing, the method further includes removing the plurality of alignment pins from the plurality of alignment pin recesses.

16. The method of claim 14, wherein, subsequent to the lowering the floor grid relative to the fuselage barrel and prior to the installing, the method further includes locating a plurality of expanding pins within the airframe, wherein each of the plurality of expanding pins extends through a selected floor-side attachment hole and also through a corresponding barrel-side attachment hole.

17. The method of claim 16, wherein the method further includes expanding the plurality of expanding pins to align each of the plurality of floor-side attachment holes with the corresponding barrel-side attachment hole.

18. The method of claim 17, wherein the method further includes clamping each of the plurality of floor-side fittings to a corresponding barrel-side fitting to restrict relative motion therebetween.

19. The method of claim 18, wherein, subsequent to the clamping, the method further includes removing each of the plurality of expanding pins from the selected floor-side attachment hole and from the corresponding barrel-side attachment hole.

20. The method of claim 14, wherein the floor grid includes a passenger surface that has a passenger surface plane that has a surface normal direction, and further wherein the operatively aligning includes deforming the floor grid in a direction that is substantially parallel to the surface normal direction and concurrently deforming the fuselage barrel in a direction that is substantially perpendicular to the surface normal direction.

* * * * *